No. 866,594. PATENTED SEPT. 17, 1907.
J. LUNOE.
SCREW DRIVER.
APPLICATION FILED OCT. 29, 1906.

WITNESSES
INVENTOR
JOSEPH LUNOE
BY Paul & Paul
HIS ATTORNEYS.

UNITED STATES PATENT OFFICE.

JOSEPH LUNOE, OF MINNEAPOLIS, MINNESOTA, ASSIGNOR OF ONE-FOURTH TO GEORGE SALZER, OF MINNEAPOLIS, MINNESOTA.

SCREW-DRIVER.

No. 866,594.     Specification of Letters Patent.     Patented Sept. 17, 1907.

Application filed October 29, 1906. Serial No. 340,937.

*To all whom it may concern:*

Be it known that I, JOSEPH LUNOE, of Minneapolis, Hennepin county, Minnesota, have invented certain new and useful Improvements in Screw-Drivers, of which the following is a specification.

The object of this invention is to provide a tool adapted for any size of screw.

A further object is to provide a tool which may be used either with a brace or with a driving shank of the spiral type.

A further object is to provide a screw driver which will fit slots of different depth in the screw head and be prevented from slipping off the head when in use.

The invention consists generally in providing a shank having jaws and a disk having a series of screw-head-engaging ends rotatably mounted in said jaws.

Further, the invention consists in mounting the disk to permit adjustment thereof lengthwise of the tool shank.

Figure 1:
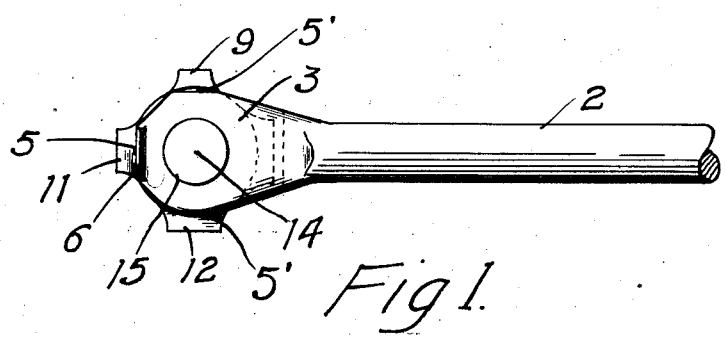
Figure 2:
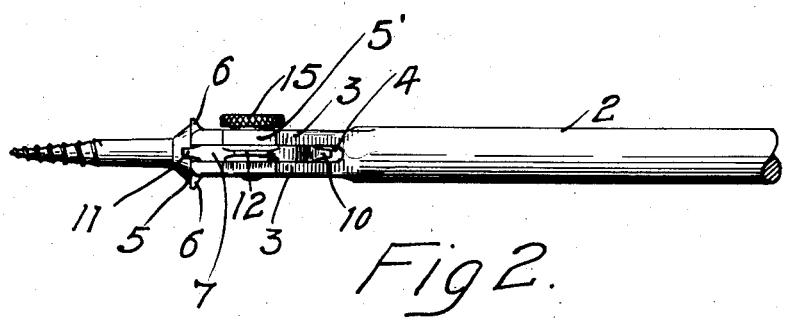
Figure 3:
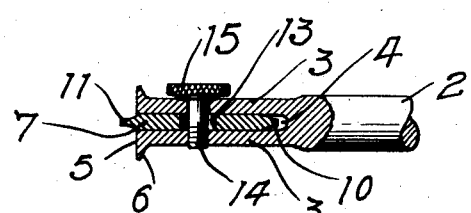
Figure 4:
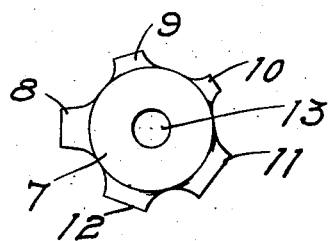

In the accompanying drawings, forming part of this specification, Figure 1 is a side view of a screw driver shank with my invention applied thereto. Fig. 2 is an edge view of the same showing the tool in use. Fig. 3 is a sectional view showing the manner of mounting the disk in the jaws of the shank. Fig. 4 is a detail view of the disk.

In the drawing, 2 represents a shank having means, (not shown,) for attachment to the ordinary breast brace or it may be adapted to have the spiral form of driver if preferred. The shank at one end is provided with flattened jaws 3 having a recess 4 between them, said jaws terminating in flattened bearing faces 5 having laterally extending lips 6 which may be utilized for driving a screw in a corner or angle. The sides of the jaws are also provided with flattened faces 5' which form bearing surfaces to engage the head of a screw when the tool is used as an off-set driver.

7 is a plate or disk preferably of steel having on its periphery a series of blunt ends 8, 9, 10, 11 and 12 of different lengths and widths to adapt the device for use with screws of different sizes. The end 8 is preferably made longer than the others for use in counter sinking a screw head. I have shown five of these ends on the periphery of the disk, but a greater or less number may be employed as preferred. The disk has a central hole 13, and a screw 14 threaded at one end, extends through the jaws and through the hole in the disk and is provided with a milled head 15 by means of which the jaws can be squeezed to clamp the disk and hold it securely between them. The hole in the disk is considerably larger than the shank of the screw 14 to permit adjustment of the disk lengthwise of the jaws or laterally with respect thereto, for the purpose of increasing or decreasing the degree of projection of the screw driving ends with respect to the bearing faces of the jaws.

To use the device the disk is rotated until the proper end is in working position and the projection of such end beyond the jaws regulated according to the depth of the slot in the screw head and to allow the ends of the jaws to bear on the head during the operation of driving the screw. The pressure will then be taken up entirely by the shank and there will be no tendency to force the disk further back between the jaws and the jaws having a broad bearing surface on the head of the screw there will be no tendency for the tool to slip out of place while in use. Two of the ends, as indicated in Fig. 1 will project laterally beyond the jaws on each side in addition to the one at the end and consequently without readjusting the tool it can be used as an off-set driver.

The tool may be made in any suitable size according to the character of the work for which it is to be used.

I claim as my invention:—

1. A screw driver comprising a shank having jaws at one end that are outwardly turned and formed into transverse lips adapted to engage the slot in a screw and a disk rotatably mounted between said jaws and having ends projecting beyond the same.

2. A screw-driver comprising a shank having jaws terminating in flattened ends and having convex side edges provided with flattened surfaces, said flattened ends and surfaces being adapted to bear on the head of a screw when the tool is in use, a disk rotatably mounted between said jaws and having a series of screw driving ends for screw heads of different depth, each of said ends projecting relatively the same distance beyond the flattened ends of said jaws and the flattened side edges thereof, whereby the tool can be readily adapted for straight or offset work, substantially as described.

3. A screw driver comprising a shank having jaws provided with flattened bearing surfaces on their side edges, a disk rotatably mounted between said jaws and having a series of ends adapted to project beyond the edges of said jaws and engage the slot in the head of a screw, means for securing said disk to prevent premature movement, and the flattened edges of said jaws being adapted to bear on the head of a screw and prevent the device from slipping, and the location of said flattened surfaces permitting the use of the tool as an offset screw driver, substantially as described.

In witness whereof, I have hereunto set my hand this 25th day of October, 1906.

JOSEPH LUNOE.

Witnesses:
   RICHARD PAUL,
   J. B. ERA.